(12) United States Patent
Hill

(10) Patent No.: US 9,516,968 B2
(45) Date of Patent: Dec. 13, 2016

(54) WATER HEATER

(71) Applicant: Appkettle Limited, Cleveland (GB)

(72) Inventor: Robert Hill, Cleveland (GB)

( * ) Notice: Subject to any disclaimer, the term of this patent is extended or adjusted under 35 U.S.C. 154(b) by 0 days.

(21) Appl. No.: 14/413,052

(22) PCT Filed: Jul. 3, 2013

(86) PCT No.: PCT/GB2013/051765
§ 371 (c)(1),
(2) Date: Jan. 6, 2015

(87) PCT Pub. No.: WO2014/006405
PCT Pub. Date: Jan. 9, 2014

(65) Prior Publication Data
US 2015/0164260 A1    Jun. 18, 2015

(30) Foreign Application Priority Data
Jul. 3, 2012 (GB) .................................. 1211882.4

(51) Int. Cl.
| H05B 1/02 | (2006.01) |
| A47J 27/21 | (2006.01) |
| A47J 27/212 | (2006.01) |

(52) U.S. Cl.
CPC ......... *A47J 27/21091* (2013.01); *A47J 27/212* (2013.01); *A47J 27/21008* (2013.01); *A47J 27/21083* (2013.01)

(58) Field of Classification Search
CPC .................... A47J 27/21091; A47J 27/21083; A47J 27/212; A47J 27/21008; A47J 27/2105; H05B 1/02; H05B 1/0269; H05B 1/0297; H05B 3/0071

USPC ........ 219/494, 481, 497, 506, 518; 392/441, 392/444
See application file for complete search history.

(56) References Cited

U.S. PATENT DOCUMENTS

| 4,588,875 A | * | 5/1986 | Kozak et al. .................. 219/485 |
| 7,706,671 B2 | * | 4/2010 | Brown .......................... 392/498 |
| 7,798,053 B2 | * | 9/2010 | Clark et al. ..................... 99/281 |
| 8,126,320 B2 | * | 2/2012 | Cartwright .................... 392/451 |
| 2005/0131553 A1 | | 6/2005 | Yoon |
| 2011/0008029 A1 | * | 1/2011 | Von Seidel ................... 392/444 |

FOREIGN PATENT DOCUMENTS

| CN | 201445353 | 5/2010 |
| CN | 202078138 | 12/2011 |
| EP | 2116158 | 11/2009 |
| GB | 2283664 | 5/1995 |
| GB | 2413477 | 11/2005 |

(Continued)

OTHER PUBLICATIONS

Apple, X10 iPhone Automation, Dec. 11, 2010, http://www.smarthome.com.au/homeautomation/x10-iphone/, 7 pages Dec. 11, 2010.

(Continued)

*Primary Examiner* — Mark Paschall

(57) ABSTRACT

The present invention provides a water heater capable of heating fluid to boiling point, wherein said heater includes a heating element, a water level gauge, a temperature measure, and a transceiver; wherein control of at least the element is provided by a mobile communication device communicating with the transceiver.

24 Claims, 5 Drawing Sheets

(56) References Cited

FOREIGN PATENT DOCUMENTS

| GB | 2475324    | 5/2011  |
|----|------------|---------|
| JP | 4312412    | 11/1992 |
| WO | 03085896   | 10/2003 |
| WO | 2007131271 | 11/2007 |

OTHER PUBLICATIONS

Arduino, Arduino Web Switch: Turn your kettle ON via Internet, Jun. 6, 2012, hobbyist.co.nz; http://wwvv.hobbyist.co.nz/?q=web-switch-tutorial and http://www.hobbyist.co.nz/?q=search/node/Turn%20your%20kettle%20 ON%20via%20Internet, 11 pages Jun. 6, 2012.

* cited by examiner

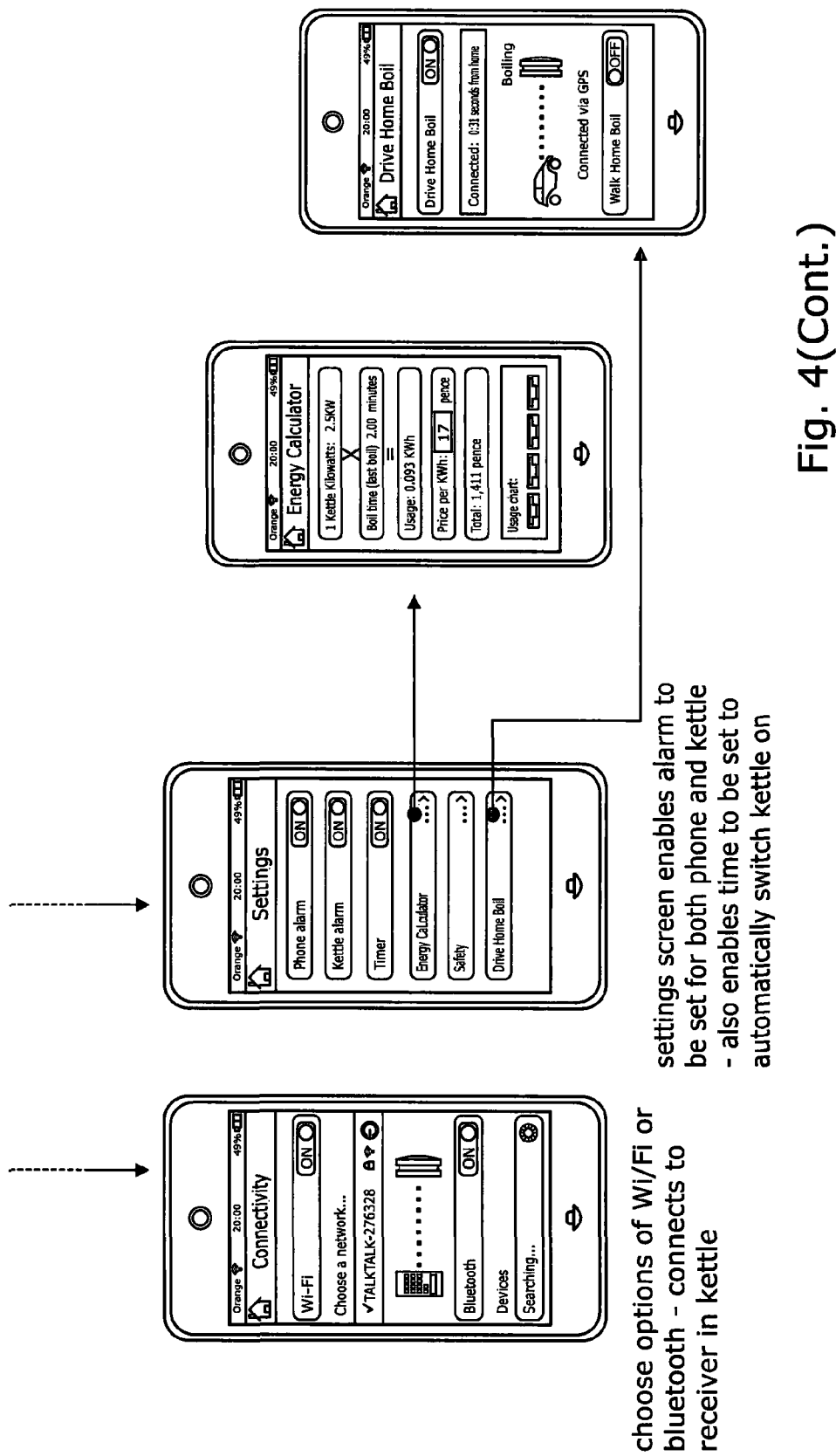

WATER HEATER

FIELD OF THE INVENTION

The present invention relates to a water heater, more particularly a heater for heating water for hot drinks.

BACKGROUND

Increasing awareness of the benefits of tea drinking has spread through many societies, and has particularly been strong for individuals averse to consuming alcohol.

Whereas other hot drinks or foodstuffs using heated water, such as instant coffee granules, do not require boiled water, tea is superior when made with freshly boiled water.

Concurrently to this spread of tea-drinking there has been improvement in many societies of electrical provision, wherein to heat water for tea making it is currently quickest, easiest and most cost effective to heat and boil the water in an electrical kettle, according to quantities required.

Such kettles carry an indicator or gauge which shows the amount of water in the kettle, and a simple electrical element which heats up as electricity is passed through it.

However, even in current times of relative scarcity, frequently users will boil too much water, and will often boil the water again after initial boiling, in order to ensure freshly boiled water.

PRIOR ART

Accordingly a number of patent applications have been filed in an attempt to resolve the problem or similar, including the following:

Granted Australian patent AU 2010 101 333 (WIDANAGAMAGE) discloses a cordless kettle and base for supplying power to that kettle, wherein: the base has a first electrical power supply coupling that cooperates with a second power coupling on the kettle; the base and kettle being adapted to engage in a transmission of data signals that are delivered through the first and second power supply couplings, wherein: the base further comprises user controls whose inputs can be interpreted as commands by a processor located in the base, the commands being used to control the kettle via the first and second power supply couplings.

Granted United States patent U.S. Pat. No. 7,706,671 (BROWN) discloses a container for heating contents, the container comprising: an internal cavity forming a concave internal cavity configured to receive the contents; an outer surface encompassing the internal surface; an electric heating element interposed between an internal surface and an outer surface; a connector configured to connect to a power source so as to provide power to the heating element; at least one of a temperature sensor configured to sense a temperature of the contents, a pressure sensor configured to sense a pressure within the internal cavity, and a motion sensor configured to sense a motion of the container; an input configured to receive a first command and a second command, a processor configured to set a desired temperature to which said contents are to be heated based on the first command, and said processor having two sets of instructions executable in at least one of two modes of operation, the instructions for the first preset mode instructing the processor to operate in a first preset display mode, said first preset display mode comprised of predetermined intervals display of the actual and desired temperature of the contents displayable upon at least one display, said processor being further configured to control the electric heating element based upon said first command and based upon at least one of a temperature of the contents, a pressure within the internal cavity, and a motion of the container, wherein instructions for the second mode instructing the processor to operate in a second manually selectable mode is separated by an interval display of the actual and desired temperatures as designated by the second command and displayable on at least one display; and an alarm with an indication of temperature is configured to be activated by said processor in accordance with one of said second mode having at least one of two or more alarms temperatures and two or more temperature indications separated by an interval; wherein the contents are capable of being heated by the electric heating element or an external heating source.

In contrast the present invention provides an effective means of ensuring a typically equipped user has a correct quantity of freshly boiled water when and as required by utilising systems standardly in use.

SUMMARY OF THE INVENTION

According to the present invention there is provided a kettle including a heating element, a level gauge which senses when the kettle is empty and switches off the kettle; and a transceiver wherein remote switching of the heating element is achieved by a user transmitting a command, from a mobile communication device, to the transceiver, wherein the time at which boiling of the contents is reached is determined either: from data specified by the user, or using data and a predetermined formula.

In preferred embodiments the mobile communication device and the water heater are both connected to a wireless network. A user may start the water heater, which is typically a kettle, when remotely situated from the water heater.

Some embodiments may make use of existing wireless or wired networks, for example utilising a wireless router, enabling connection with plural devices using the router as a hub. Other embodiments may include a subscriber identity module (SIM) card in the heater to connect with devices directly. Yet other embodiments may be wired into telephony networks in use.

In this way the user is able to activate their water heater, such as for example a kettle from bed, another room or even in some embodiments when outside the house, such as on a train or in a vehicle.

Typically the water heater is provided locally by a base and cordless kettle, wherein the heating element is included in the kettle and powered by wiring to the base.

Advantageously control is provided by a piece of software, which may be downloaded or downloadable to a user telephone, mobile telephone, smartphone, tablet or personal computer.

In some preferred embodiments control extends to the temperature measure, wherein the mobile communication device is enabled to register and display temperature of the water internal to the water heater, and act accordingly, such as repeat heating or pause heating, as well as allowing the user to access information about the water temperature for information purposes.

In preferred embodiments the temperature measure allows measurement of incremental temperature levels, so that awareness of boiling times may be calculable, although in other embodiments the measure is enabled to solely measure whether the water has boiled, being similar to a standard kettle circuit breaking switch.

Preferably the water heater is equipped with insulation, in order that heated water is able to be maintained at a useful temperature. In preferred embodiments the temperature is subsequently monitorable from the mobile communication device, and accordingly unnecessary heating may be avoided.

In some embodiments data calculation software may be included in the water heater and/or accessible by the mobile communication device, whereby for example the mobile communication device is enabled to calculate boiling time for the water heater, by cooperation and calculation of temperature measure and water gauge data.

In further embodiments this software is accessible remotely, through an application.

In this way the user may be enabled to set the water heater to provide boiled water on a timescale. For example the mobile communication device may be set to boil water for a defined time, or after a defined interval or both.

The mobile communication device may solely require input of a time for which the boiled water is required and data processing software downloaded to the mobile communication device is enabled to calculate a time by which the water gauged to be present in the water heater will be boiled, in reference to its current measured temperature.

In this way unnecessary water heating may be minimised, and in addition or the alternative freshly boiled water may be made available for tea at a preferred time.

Further embodiments may include controllable progressive or incremental heating, wherein the water heater includes an element capable of delivering heat to the water at different intensities.

Such embodiments allow the water heater, and more particularly the user through use of the mobile communication device, to control timing of heating cycles, for example so that the water may be kept heated for later boiling as required.

In further embodiments the water heater may be enabled to heat defined quantities of water, wherein the heater internally includes compartments or other means of defining or separating quantities.

Yet further embodiments may include water release valves able to dispense defined or definable quantities of water for heating or to a cup, wherein control may extend to such dispensing.

In preferred embodiments there is typically locally provided a visual display so that a local user is able to operate the water heater as a normal kettle. Typically this display consists of a transparent portion which gains visual access to the water heater interior.

Further embodiments may include other local display elements, for example wherein the water heater or heating element has light emitting diodes that correspond to the water level gauge or temperature measure.

The base of the water heater may also have an illumination feature which is colour coded to tell the local user whether or not the water heater is empty.

In preferred embodiments of the water heater a locally provided digital strip acts as a display, in cooperation with the internal measure, in order to display or visualise the water temperature internally to the water heater. In this way even a local user without a mobile communication device is enabled to be aware of temperature and consequent likely boiling times.

The local display may furthermore be provided with controls and/or software similar to those on the mobile communication device, in order that functions may be achieved locally at the water heater. Primarily a timing facility is ideally included locally.

Preferred embodiments of the water heater include a printed circuit board (PCB), wherein said PCB may allow accomplishment of data processing tasks, namely calculation of timings.

Yet further embodiments may allow coordination with virtual calendars or synchronisation with computing tasks, such as activation of the water heater when a computer is suspended or shut down.

The invention has been described by way of examples only and it will be appreciated that variation may be made to the above-mentioned embodiments without departing from the scope of invention.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

DETAILED DESCRIPTION OF FIGURES

Figure 1:
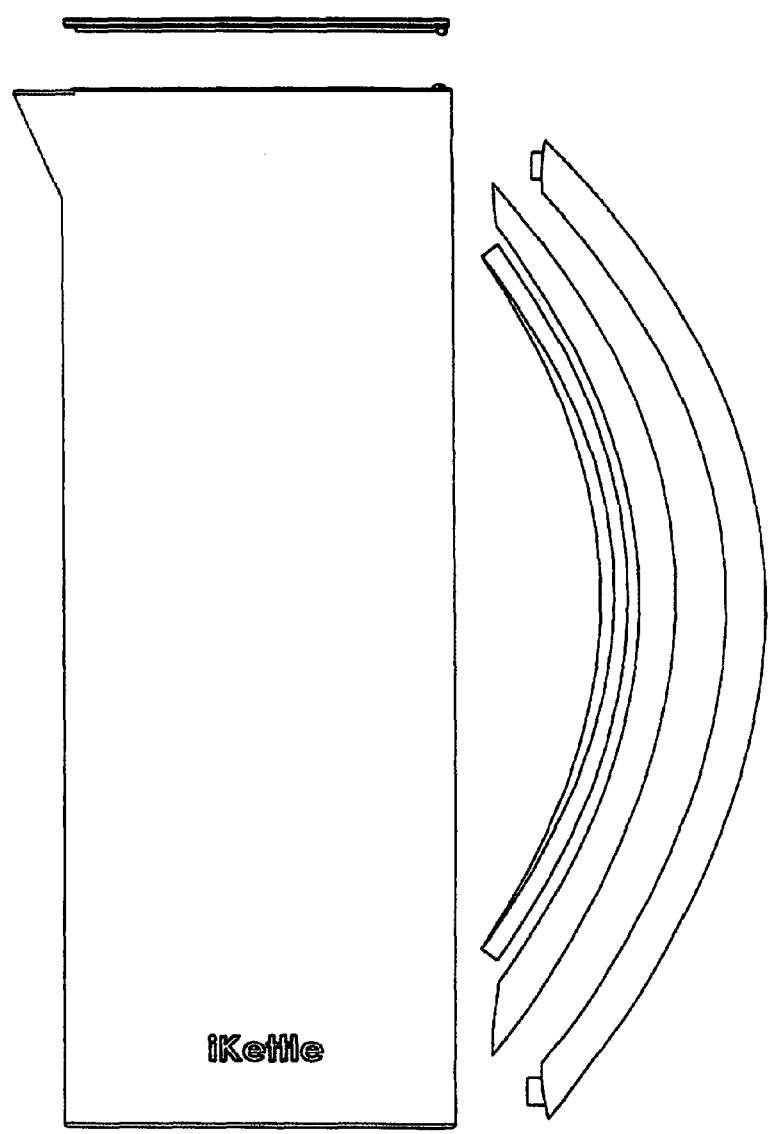
FIG. 1 shows an exploded side view of a preferred embodiment of the water heater.
Figure 2:
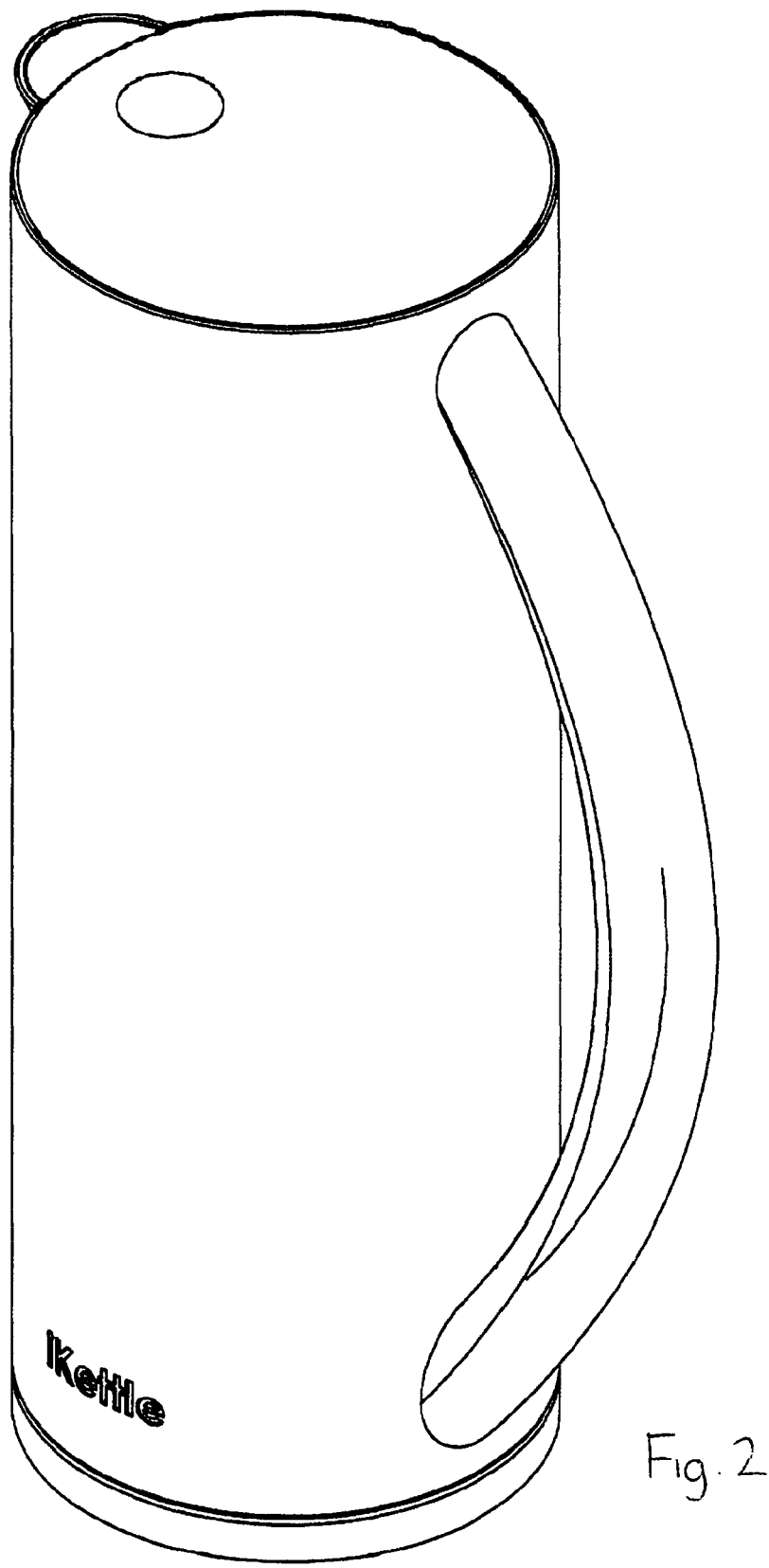
FIG. 2 shows an isometric view of the embodiment of FIG. 1.
Figure 3:
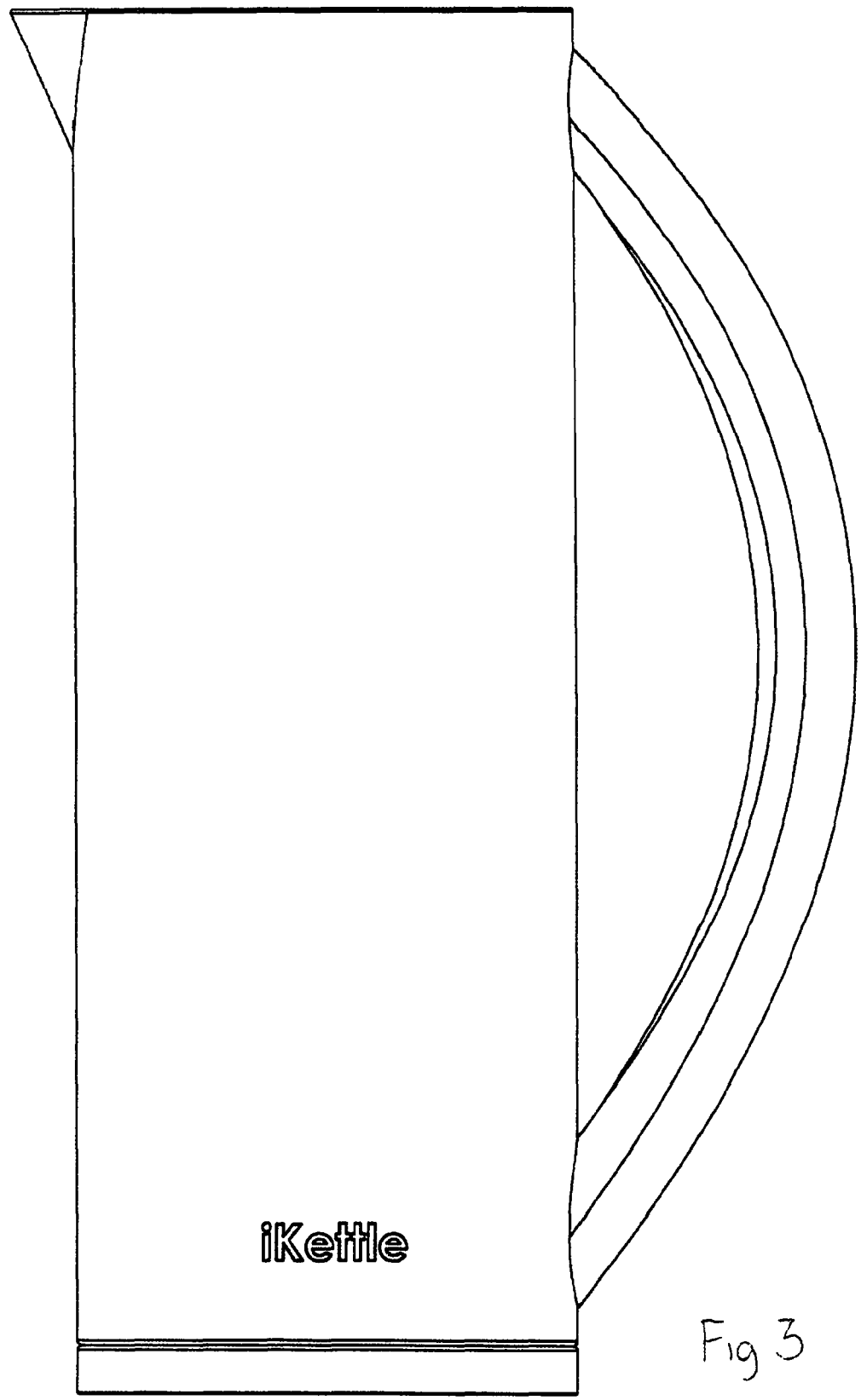
FIG. 3 shows a side view of the embodiment of FIG. 1.
Figure 4:
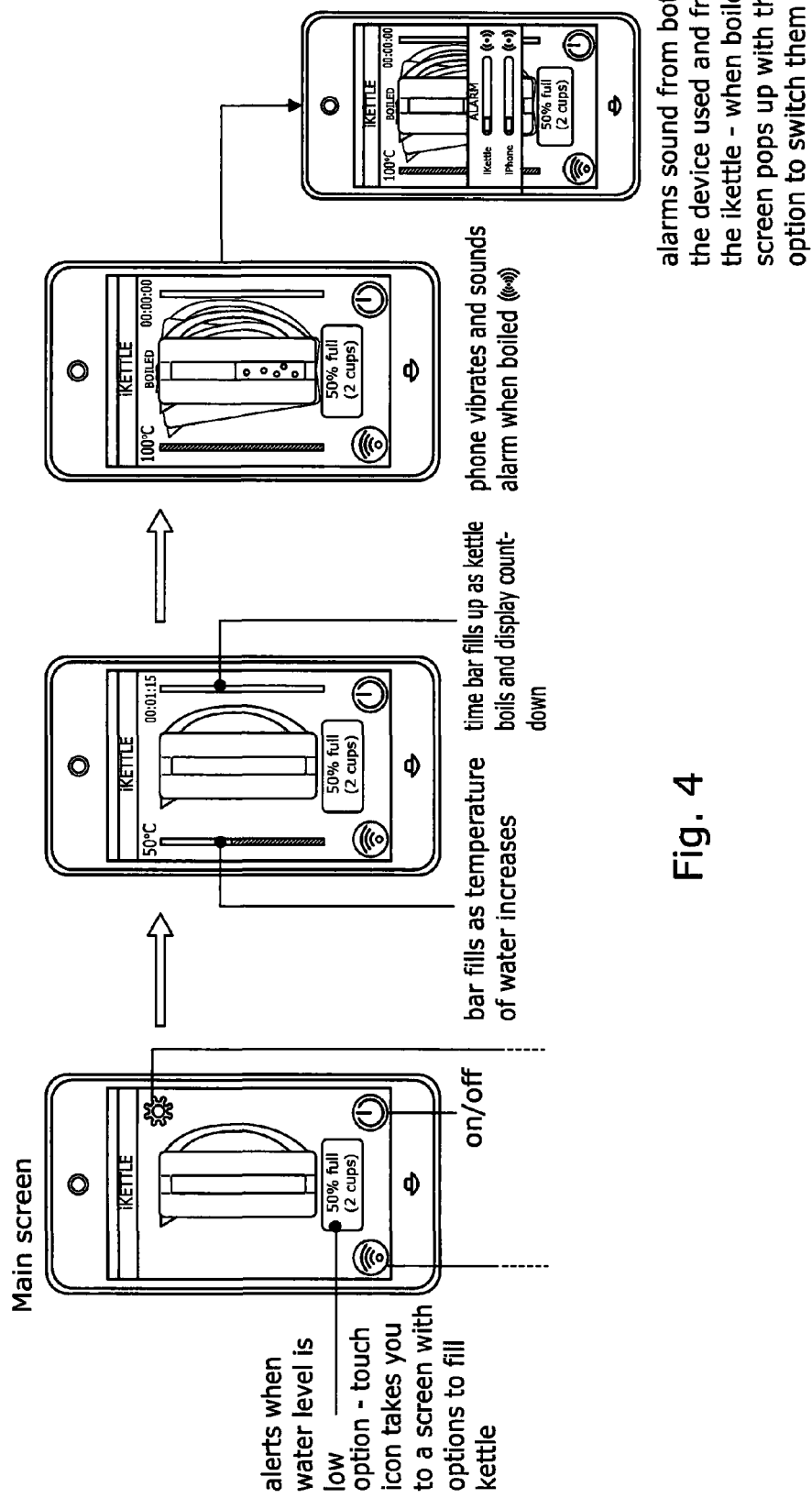
FIG. 4 shows a sketch of device software control.

The pictured and preferred embodiment is a cordless kettle 1 with a wired base 2 which can be linked to both wireless internet or Wi-Fi, BLUETOOTH (Trade Mark) or other intermachine connectivity system, allowing it to be remotely controlled via a smartphone or other computing device.

Preferably the base 2 includes the transceiver and furthermore connects with components in the kettle 1 to assess measurements.

In this way estimating the heater boiling time left based on the temperature and amount of water is possible, with a pre-defined formula for calculation, wherein said calculation is accomplished at the computing device, with accompanying software.

An audible alarm may be soundable on the computing device and kettle 1 when the water has boiled.

The device is ideally equipped with data processing software for:

Calculating the energy used to boil the water, using a pre-defined formula which takes into account amount of water and its starting temperature;

Calculating price of the boil based on a fixed pence/KWh which can be entered by a user during set up;

Only allowing the boil when there is a certain amount of water inside;

Only allowing to be boiled with password activation;

Allowing scheduled boiling, i.e. at 7:00 am Monday;

and/or

Allowing automatic boiling of water at a certain distance of the device from the water heater, wherein for example the heater location may be definable by the user.

The invention claimed is:

1. A water heater comprising:
a heating element;
a level gauge which senses when the water heater is empty and switches off the water heater;
a transceiver wherein remote switching of the heating element is achieved by a user transmitting a command, from a mobile communication device, via a wireless network to the transceiver, wherein a time at which boiling of the contents is to be reached is determined either: from data specified by the user, or using data and a predetermined formula; and
wherein the mobile communication device includes means for identifying the position of said mobile communication device and the position of the heater and measuring the distance therebetween and wherein the time at which boiling of the contents is reached is determined by the predetermined formula based upon the distance between the water heater and the mobile communication device.

2. The water heater according to claim 1, further including insulation.

3. The water heater according to claim 1, further comprising a temperature measuring means configured to measure the temperature of water in the water heater and to communicate the measured temperature data to the mobile communication device.

4. The water heater according to claim 3, wherein the temperature measuring means is configured to measure incremental temperature levels and/or that the water heater has boiled.

5. The water heater according to claim 1, wherein the level gauge is configured to gauge the amount of water present in the water heater.

6. The water heater according to claim 1, further comprising data calculation software, the data calculation software included in the water heater and/or accessible by the mobile communication device.

7. The water heater according to claim 6, wherein the time at which boiling of the contents of the water heater is reached is determined by the data calculation software according to temperature measured by the water temperature measuring means and level gauge data.

8. The water heater according to claim 1, wherein heating element is adapted to deliver heat to the water at different intensities.

9. A water heater according to claim 6, wherein the data calculation software is accessible on the mobile communication device through an application.

10. A water heating according to claim 1, wherein the water heater includes a compartment for separating a defined quantity of water from a main body of water in the water heater and wherein the heating element is configured to heat the defined quantity of water to a temperature that differs from the temperature of the main body of water.

11. A water heater according to claim 1 wherein the water heater includes water release valves.

12. A water heater according to claim 1 wherein the release valves are adapted to deliver a defined volume of heated water or water for heating.

13. The water heater according to claim 1, further comprising a communication device configured to control the water heater as defined in claim 1.

14. A kettle comprising a heating element, a level gauge which senses when the kettle is empty and switches off the kettle; and a transceiver wherein remote switching of the heating element is achieved by a user transmitting a command, from a mobile communication device, via a wireless network to the transceiver, wherein a time at which boiling of the contents is to be reached is determined either: from data specified by the user, or using data and a predetermined formula; and
wherein the mobile communication device includes means for identifying the position of said mobile communication device and the position of the heater and measuring the distance therebetween and wherein the time at which boiling of the contents is reached is determined by the predetermined formula based upon the distance between the kettle and the mobile communication device.

15. A kettle according to claim 14 which is insulated.

16. A kettle according to claim 14, comprising a temperature measuring means configured to measure the temperature of water in the kettle and to communicate measured temperature data to the mobile communication device.

17. A kettle according to claim 16, wherein the temperature measuring means is configured to measure incremental temperature levels and/or that the kettle has boiled.

18. A kettle according to claim 14, wherein the level gauge is configured to gauge the amount of water present in the water heater.

19. A kettle according to claim 14, comprising data calculation software included in the water heater and/or accessible by the mobile communication device.

20. A kettle according to claim 19, wherein the time at which boiling of the contents of the kettle is reached is determined by the data calculation software according to temperature measured by the water temperature measuring means and level gauge data.

21. A kettle according to claim 19, wherein the data calculation software is accessible on the mobile communication device through an application.

22. A kettle according to claim 14, wherein heating element is adapted to deliver heat to the water at different intensities.

23. A water heater comprising:
a heating element;
a level gauge which senses when the water heater is empty and switches off the water heater;
a transceiver wherein remote switching of the heating element is achieved by a user transmitting a command, from a mobile communication device, via a wireless network to the transceiver, wherein a time at which boiling of the contents is to be reached is determined either: from data specified by the user, or using data and a predetermined formula;
further comprising data calculation software, the data calculation software included in the water heater and/or accessible by the mobile communication device; and
wherein the time at which boiling of the contents of the water heater is reached is determined by the data calculation software according to temperature measured by the water temperature measuring means and level gauge data.

24. A kettle comprising a heating element, a level gauge which senses when the kettle is empty and switches off the kettle; and a transceiver wherein remote switching of the heating element is achieved by a user transmitting a command, from a mobile communication device, via a wireless network to the transceiver, wherein a time at which boiling of the contents is to be reached is determined either: from data specified by the user, or using data and a predetermined formula;
   comprising data calculation software included in the water heater and/or accessible by the mobile communication device; and
   wherein the time at which boiling of the contents of the kettle is reached is determined by the data calculation software according to temperature measured by the water temperature measuring means and level gauge data.

\* \* \* \* \*